United States Patent [19]

Ouw et al.

[11] 3,755,855
[45] Sept. 4, 1973

[54] METHOD FOR OPENING SHELL FISH

[75] Inventors: William Bian Gwan Ouw, Upper Montclair, N.J.; Albert Lester Johnson, Greenlawn, N.Y.

[73] Assignee: Long Island Oyster Farms, Inc., Americas, N.Y.

[22] Filed: Oct. 29, 1971

[21] Appl. No.: 193,762

[52] U.S. Cl. .................................................. 17/48
[51] Int. Cl. ............................................. A22c 29/00
[58] Field of Search ............................ 17/48, 71, 76

[56] References Cited
UNITED STATES PATENTS
3,566,438   3/1971   Snow ........................................ 17/48

*Primary Examiner*—Robert Peshock
*Attorney*—F. W. Wyman and P. R. Arvidson

[57] ABSTRACT

A method for opening shell fish such as oysters by exposing the shell overlying the adductor muscle to a concentrated beam of infra-red light for a period of time sufficient to weaken or sever the attachment of the muscle to the shell and then removing the shell.

5 Claims, 2 Drawing Figures

Patented Sept. 4, 1973  3,755,855

INVENTORS
WILLEM B.G. OUW
ALBERT L. JOHNSON
BY
*Philip R. Arvidson*
ATTORNEY

METHOD FOR OPENING SHELL FISH

BACKGROUND OF THE INVENTION

1. Field of the Invention

This application relates to a method for opening the shells of shell fish, particularly oysters.

2. Description of the Prior Art

It is extremely old and well known to open shell fish such as oysters by hand by the use of an oyster knife or similar implement. However, this method is slow and has a potential for injury to the person opening the shell fish because of the difficulty of opening the shell, the dexterity required, and the sharp implement used. Furthermore, because of the labor involved and the time consumed, this method is expensive. Also, persons with the skill required to do this work by hand are rapidly disappearing from the scene either because of age or because of change to more desirable and higher paying occupations.

Numerous methods have been tried to eliminate or reduce the hand labor discussed in the previous paragraph. For example, electric fields, microwaves and direct flame contact have been tried. All of these methods have been found to have disadvantages.

The use of an electric field is disclosed in U.S. Pat. No. 3,070,834. Although it is said to be successful with scallops, it has not found significant success with other shell fish and has, rather, resulted in cooking of the oysters in their shells to an undesirable extent. Such cooking renders them unsuitable for some markets for oysters, i.e., oysters on the half shell and other raw forms of oysters.

The use of microwaves is disclosed in U.S. Pat. No. 3,585,676. Although the use of microwaves has met with some success in the opening of oysters and other shell fish, such microwave use is in its infancy. Microwave equipment is expensive and, furthermore, when microwaves are used, care must be taken to protect persons working with the apparatus from radiation leakage.

The use of direct heat or flame is disclosed in U.S. Pat. No. 3,230,580. Such methods have often had the disadvantage of cooking the shell fish in the shell to an undesirable extent. Furthermore, these processes require rather elaborate equipment and some require or result in the additional step of removal of the liquid from the shell before or during heat treatment. Such liquid removal is, of course, undesirable where oysters are to be marketed on the half shell.

SUMMARY OF THE INVENTION

Applicants have now developed a novel, fast and inexpensive method for opening oysters and other shell fish. This method reduces significantly the effort and skill required by persons opening the shell fish. Also, it presents little or no potential for injury to the laborer. Furthermore, the product obtained from this process is an uncooked, still cool raw oyster, on the half shell if desired. This process is thus usable on oysters intended for the most discriminating consumer. Oysters treated by this process have even been found to be frequently still alive after treatment and have been observed to remain so for periods up to half a day after treatment, as indicated by a noticeable heartbeat.

Broadly, the preferred embodiment of this novel process comprises the steps of 1. exposing the flat shell of the shell fish, in the region where the adductor muscle is attached to the shell, to a concentrated beam of infra-red light for a period of time sufficient to weaken or sever the muscle attachment and render the flat shell easily removable, and 2. removing said flat shell by hand or other means.

Although it is preferred to expose the flat shell of the oyster, particularly when half-shell oysters are desired, this process also works on either or both shells of the oyster or other shell fish. The main objective is to apply infra-red light to the shell in the region where it overlies and is attached to the adductor muscle which holds the oyster closed.

The skill which has in the past been required of persons opening oysters has been required due to the fact that the oyster exerts such a strong force to keep its shell closed. In view of that strong force, it has in the past taken considerable manual dexterity and no small amount of strength to open an oyster, generally with a sharp knife. Due to the irregular shape of the oyster shell and the fact that they are generally wet, the job of sliding the knife quickly and strongly between the two shells of the oyster has required skill to avoid slippage and cutting of the hands and strength to pry open the shell. Further, particularly advanced skill has been required to achieve the speed required to open oysters at an economically feasible rate for a commercial operation.

By the above-described novel method of opening oysters, the muscle attachment is severed or weakened to the point where the oyster can be opened by ordinary unskilled labor and such opening requires no great manual dexterity or physical strength. Rather, it is only required to slip an instrument such as a knife blade between the oyster shells and gently twist to remove the flat shell and break the ligament bond at the hinge between the two shells. In some instances, particularly with very fresh oysters, the muscle is severed and the oyster gaps, thus allowing the shell to be lifted off without need for a knife or other opening implement.

In referring to the shells of an oyster, it should be remebered that such shell fish generally have an outwardly convex shell half and a rather flat shell half.

Figure 1:
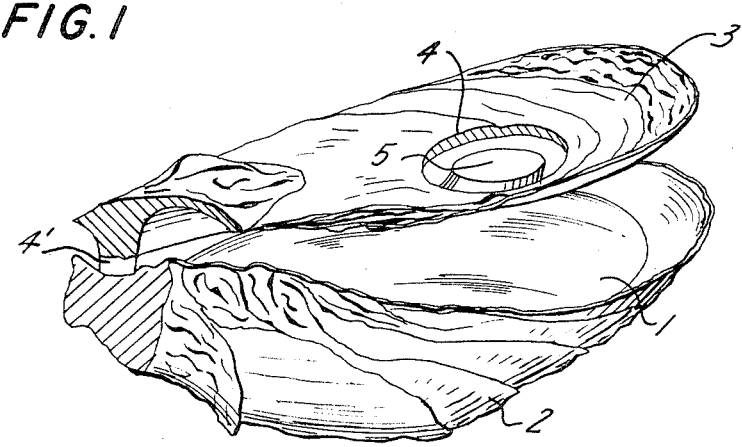
FIG. 1 is a view in partial cross-section of an oyster.

Referring more particularly to FIG. 1, reference numeral 1 indicates the meat of an oyster. Reference numeral 2 designates the outwardly convex half shell of the oyster. Referenc numeral 3 denotes the flat half shell of an oyster, and reference numeral 4 indicates the region of this flat half shell which overlies and is attached to the adductor muscle 5 of the oyster. Reference numeral 4' indicates the ligament joining the two half shells.

Figure 2:
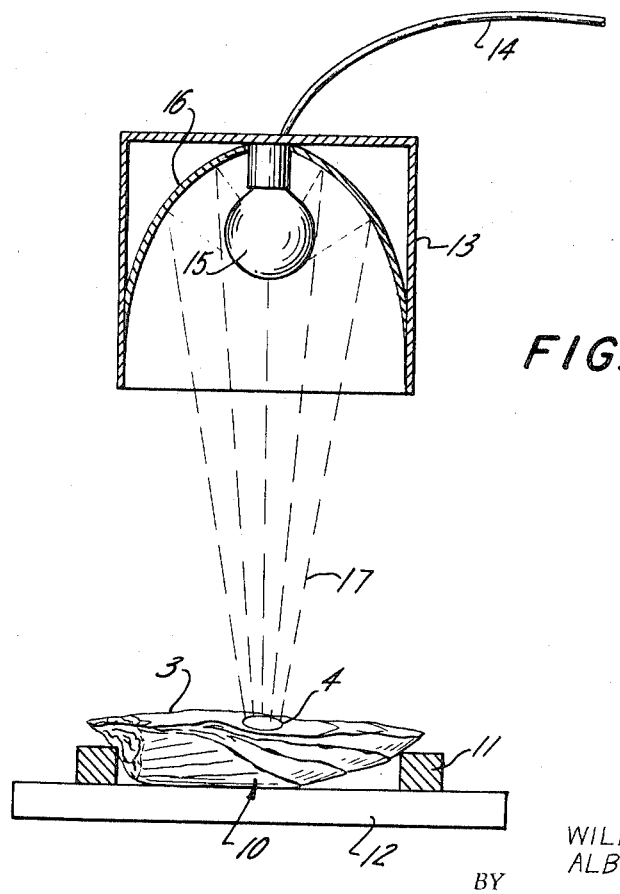
FIG. 2 illustrates the application of a beam of infra-red light to an oyster.

Referring more particularly to FIG. 2, reference numeral 10 indicates an oyster positioned flat side up and held in place by any conventional means such as ring 11 on a surface 12. Reference numeral 13 indicates the housing of an infra-red lamp which is powered by electric power from a conventional electric cord 14 and socket (not shown). Reference numeral 15 indicates the infra-red lamp bulb. Reference numeral 16 indicates an ellipsoidal focusing reflector, and reference numeral 17 incidates a focused beam of infra-red light emitting from the infra-red lamp bulb 15 and striking the flat shell 3 of the oyster in the region 4 where the adductor muscle is attached.

DESCRIPTION OF THE PREFERRED EMBODIMENT

As an example, applicants have found that a forced-air-cooled, 1 ¾ inch focal length, 1,000 watt infra-red lamp having a beam width of 5/16 inch diameter at the focal length will function well in the method of this application. Such a lamp operates on 110 volts AC at 60 CPS. The lamp is provided with an ellipsoidal reflector which focuses the infra-red light into the above-mentioned beam. Such a lamp is available from Spectra Instruments, Inc., 1712 South Olden Avenue, Trenton, N.J. under the trade name Infradex.

Applicants have found that using the above-described apparatus oysters can be effectively treated by exposing them for a period of from about 2.5 seconds to about 20 seconds per oyster, preferably from about 5 seconds to about 15 seconds, obtaining a significant reduction in the force required to open the oyster without cooking the oyster. The longer exposure times in these ranges are, of course, required for thicker-shelled oysters, while the shorter times may be used for smaller, thinner-shelled oysters.

Although significant reduction in the amount of force required to open the oyster is apparent immediately after infra-red treatment, best results are achived with least effort if there is a short delay, up to about a minute, before opening the oyster.

The above description of apparatus and times required is merely exemplary, and it will be obvious to those skilled in the art that modifications can be made while still obtaining effective oyster opening. Obvious areas of modification would, of course, be the power of the bulb used, the manner of positioning the oyster for exposure, the diameter of the beam, the focal length and the time of exposure for a given power of bulb.

Following exposure in the manner described above, at rates of up to 24 oysters per minute, it was found that the flat shell of the oyster could be readily removed from the hinge with little effort by merely inserting a sharp instrument such as a knife blade between the two shells and twisting. Where very fresh oysters were used, gaping sometimes occurred, thus obviating the need for the knife and allowing the shell to be removed by hand.

The region where the adductor muscle of the shell fish attaches to the shell will be obvious to those skilled in the art. Thus, positioning of the oyster or other shell fish so that the beam is in optimum relation to this region will be well within the skill of those skilled in the art, as will the determination of an effective amount of infra-red radiation in view of the above example.

In order to obtain a commercial rate of oyster opening, it may be desirable to employ conventional indexing tables to pass the oyster into position under the beam, trigger and shut off the beam, and then remove the exposed oyster from the beam.

It is envisioned that removal of the shell from the oyster after infra-red treatment may also be accomplished by mechanical lifting means such as suction cups, as well as by hand.

We claim:
1. A method of opening shell fish comprising
   a. exposing at least one half shell of the shell fish in the region of attachment of the adductor muscle to a focused infra-red light means for a period of time sufficient to weaken or sever the attachment of the shell to the muscle, and
   b. subsequently removing said half shell from the shell fish.
2. The process of claim 1 wherein the shell fish is an oyster.
3. The process of claim 2 wherein the exposed half shell is the flat half shell of the oyster.
4. The process of claim 3 wherein the resulting oyster meat remains cool.
5. The process of claim 4 wherein the resulting oyster is still alive.

* * * * *